United States Patent [19]

Haskins

[11] Patent Number: 4,517,420
[45] Date of Patent: May 14, 1985

[54] INTEGRAL CUP AND HOOKSWITCH ACTUATOR FOR A TELEPHONE SET

[75] Inventor: Steve W. Haskins, Mount Juliet, Tenn.

[73] Assignee: Northern Telecom Limited, Montreal, Quebec, Canada

[21] Appl. No.: 486,722

[22] Filed: Apr. 20, 1983

[51] Int. Cl.³ .............................................. H04M 1/08
[52] U.S. Cl. .................. 179/164; 179/100 C
[58] Field of Search .................. 179/164, 159, 100 C, 179/100 D, 100 R

[56] References Cited

U.S. PATENT DOCUMENTS 2,089,386 8/1937 Lum ................................. 179/100 R
4,188,512 2/1980 Lord ................................ 179/100 C Primary Examiner—Thomas W. Brown
Attorney, Agent, or Firm—Schwartz, Jeffery, Schwaab, Mack, Blumenthal & Koch

[57] ABSTRACT

A telephone set, adaptable for either wall or desk top mounting, has an integral hookswitch and cup. The cup is at the rear of the telephone set, in the desk mounting mode, and at the top in the wall mounting mode. The cup receives the receiver end of the handset. The cup as a whole is pivoted and has a lever which acts on contact actuators of a switch. The cup is biased up, to an off hook position, being depressed by the handset to the on hook position.

12 Claims, 5 Drawing Figures

INTEGRAL CUP AND HOOKSWITCH ACTUATOR FOR A TELEPHONE SET

This invention relates to an integral cup and hookswitch actuator, for a telephone set.

Conventionally, the hookswitch of a telephone set is actuated by a member projecting up through the top housing of the telephone set base. Placing the handset on the base pushes down the member, actuating the hookswitch to an "on hook" condition. Removal of the handset actuates the hookswitch to the "off hook" condition.

In many telephone sets the hookswitch actuator or plunger extends up through one of the cups into which is positioned either the transmitter or receiver end of the handset. In particular, the actuator or plunger usually projects up through the cup which receives the receiver end of the handset, this cup being the rear cup in a desk mounted set and the top cup in a wall mounted set.

The actuator or plunger must be so designed, and installed, that the weight of the handset will move the actuator or plunger when the handset is replaced. Because of the differing directions in which the weight of the handset acts in desk mounting and wall mounting, the actuator or plunger is often of different form for the two different mounting positions. Thus in a desk mounting telephone set, the actuator or plunger is arranged to move in a generally vertical direction under the vertical load applied by the handset, that is in a direction more or less normal to the plane of the support surface.

For a wall mounting telephone set, the actuator or plunger is arranged to provide a movement generally normal to the vertical under the vertical load of the handset. The actuator is required to provide an actuating force generally at right angles to the direction of the loading by the handset.

For telephone sets capable of being alternatively mounted on desk or wall, problems arise in obtaining acceptable operation of the hookswitch actuator or plunger. If an acceptable operating force is obtained in a desk mounting position, for example, then an insufficient operating force is obtained in a wall mounting position. If an acceptable operating force is obtained in a wall mounting position, either an insufficient operating force or an unacceptably high operating force can occur in a desk mounting position.

The present invention provides for alternative mounting positions, while ensuring acceptable operating characteristics. Instead of the hookswitch actuator or plunger extending up through a cup, the cup is made separate from the top housing of the telephone set then pivotally mounted on the top housing. The cup itself acts as the actuating member, or plunger, for operating the hookswitch. The geometry of the cup structure can be designed to give a desired operating force to the hookswitch contacts independently of the mounting position.

Broadly, in accordance with the invention, there is provided an integral cup and hookswitch actuator which comprises a cup pivoted at an outer edge on a telephone set base, with a lever extending from the pivotal axis to engage with a hookswitch, and biasing means positioned to pivot the cup upwards or forwards at its inner edge to an off hook position depending upon the mounting position, the cup pivotal against said biasing means when the telephone handset is replaced, to an on hook position.

The invention will be readily understood by the following description of an embodiment, by way of example, in conjunction with the accompanying drawings, in which:

FIG. 3 is a cross-section similar to that of FIG. 2, but with the cup in an on hook position;

Figure 1:
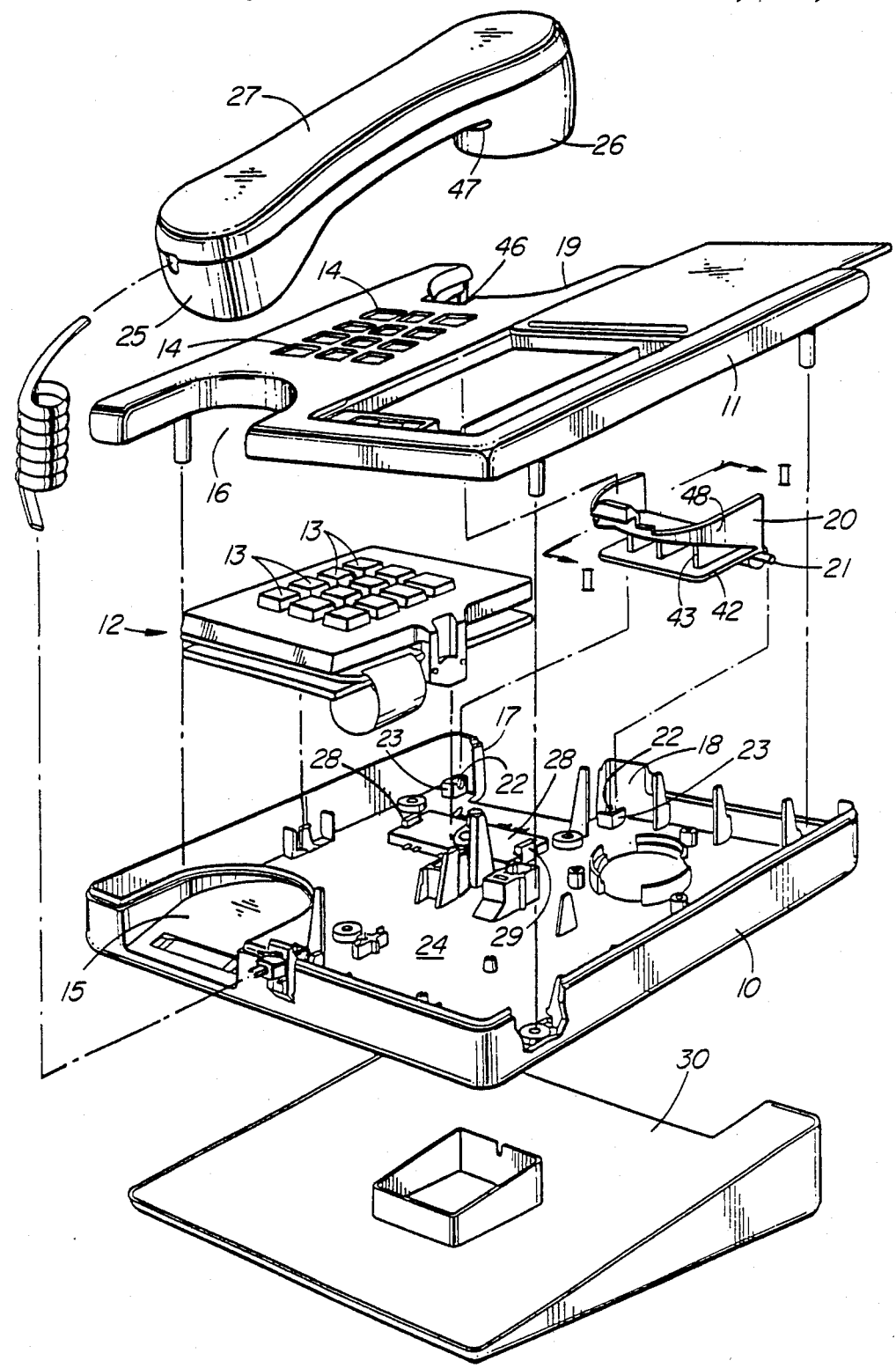
FIG. 1 is an exploded perspective view of a telephone set incorporating the invention.

As illustrated in FIG. 1, a telephone set comprises a base housing 10 and a top housing 11 which are assembled together to form a telephone set base. Within the base are positioned various components, such as ringer, a circuit board and other items, not shown in FIG. 1 as they are not pertinent to the present invention. A dial pad assembly, indicated generally at 12 is mounted in the base, the push buttons 13 extending up through apertures 14 in the top housing 11.

Formed in the base housing 10, at a forward edge as illustrated in FIG. 1, is a cup 15. The top housing 11 has a U-shaped opening 16 which aligns with the cup 15. At the rear edge or end of the base housing, as seen in FIG. 1, a wide slot 17 is formed in the wall 18 and a further U-shaped opening 19 is formed in the top housing at a rear edge. A cup 20 is aligned with the slot 17, the cup 20 having laterally extending pivot members 21 which rest in grooves or slots 22 having semicylindrical bottom surfaces, the slots 22 formed in brackets 23 extending up from the bottom surface 24 of the base housing. The two cups 15 and 20 receive the transmitter and receiver housings 25 and 26 respectively of the handset 27. Positioned on the bottom surface 24 of the base housing 10 is a hookswitch 28, the hookswitch located by two ribs 29 extending up from the bottom surface 24.

A wedge shaped adaptor 30 fits on to the outer bottom surface of the base housing 10, the wedge inclination being reversed from that shown in FIG. 1 for wall mounting. FIG. 1 illustrates the arrangement of base and adaptor for desk mounting.

Figure 2:
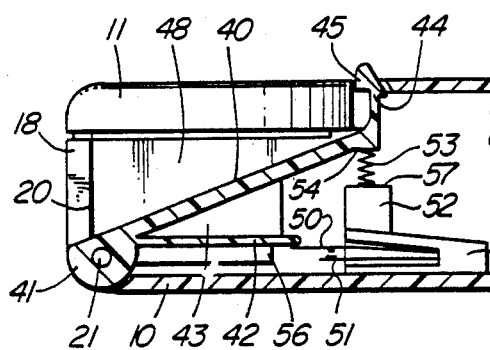
FIG. 2 is a diagrammatic cross-section on the line II—II of FIG. 1, the cup in an off hook position.

Referring now to FIGS. 2 and 3, there is illustrated the rear end of the telephone set base in section through the cup 20. As is seen, the cup has an inclined bottom surface 40, inclined forward and upward from its outer edge at 41, the pivots 21 indicated at this outer edge. Also extending from the outer edge, inwards, is a lever 42, the lever 42 supported from the bottom surface 40 by ribs 43. At its inner edge the cup 19 has an upward extending lip 44 having rearwardly extending rib 45, at its top edge. Lip 44 fits in a recess 46 in the base of the U-shaped opening 19 in the top housing 11 (FIG. 1). The rib 45 engages in a slot 47 on the inner side of housing 26. The cup 20 is open at its rear, being aligned with the slot 17 in the base housing. Side walls 48 are aligned at their outer edges with the sides of the slot 17.

The hookswitch 28, in the present example, is of a form as described in U.S. Pat. No. 4,259,558, in the name of the present assignee, and the disclosure of which is included herein by specific reference. Such a switch has a plurality of sets of contact members, the contact members of a set being in stacked relationship. In FIGS. 2 and 3 a pair of contact members 50 and 51 are illustrated. Contact member 50 is extended beyond contact members 51 and is engaged at the extended portion by the inner end of lever 42. The pair of contacts 50, 51 are shown as normally open in an off hook condition and closed in an on hook condition. However, if the lower contact member 51 is extended instead of contact member 50, then a reverse contact condition can apply, that is normally closed on off hook and open on on hook. Three contact members can be stacked, the center contact member extended, to provide a transfer switch or contact arrangement.

Extending upward on the top surface of the hookswitch 28 is a hollow boss 52. A compression spring 53 is positioned in the boss 52 and bears against the underside of the bottom surface 40, a short level portion 54 being provided to form an abutment for the spring. Spring 53 biases the cup 20 upwards, at its inner edge 44, about the pivots 21.

Figure 5:
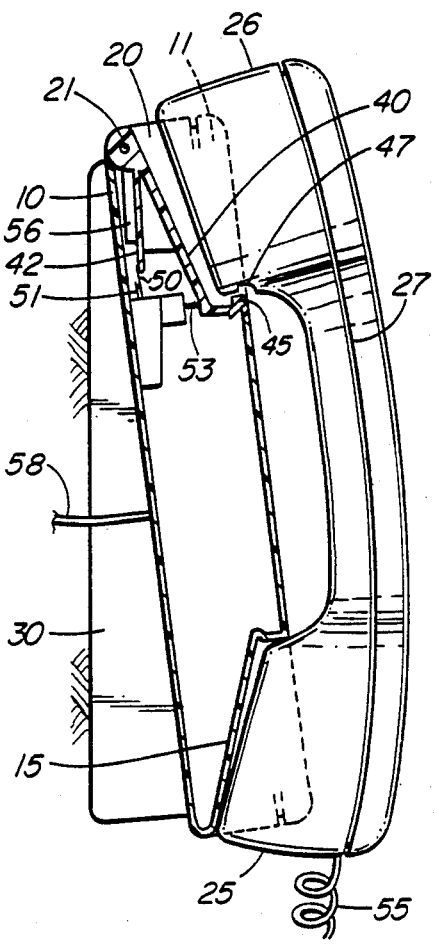
FIGS. 4 and 5 are diagrammatic illustrations of the two alternative mounting positions.
Figure 4:
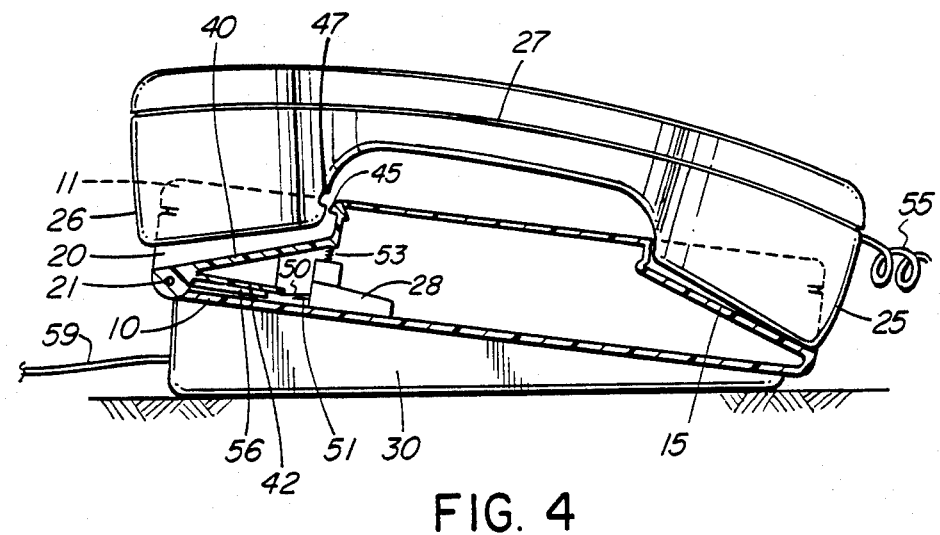

FIG. 4 is a diagrammatic illustration of a telephone set desk mounted, while FIG. 5 is a diagrammatic illustration of a telephone set wall mounted. In both Figures the receiver end of the handset is shown slightly raised from the cup 20, but this is for clarity only and the handset should be considered as touching both cups 14 and 20, and with rib 45 in the slot 47.

In FIG. 4, the handset rests in both cups 14 and 20, part of the weight of the handset taken by cup 14 and part by cup 20. That part of the handset weight taken by cup 20 pivots cup 20 against the spring 53 and actuates the contacts 50, 51 to the on hook condition. In FIG. 5 the whole weight of the handset is taken by the cup 20. This weight again pivots cup 20 against the spring 53 to actuate the contacts 50, 51 to the on hook condition. The lever arm through which the weight of the handset acts is shorter in FIG. 5 than in FIG. 4. Thus the extra weight experienced by the cup 20 when the telephone set wall mounted is counterbalanced by the reduced lever arm. It is possible to adjust the lever arm in both FIG. 4 and FIG. 5 by changing the length of the lever 42, relative to other dimensions. Also, the depth of the cup 20 can be varied slightly, which in turn moves the lever arm through which the weight of the handset acts.

In the wall mounting position, as illustrated in FIG. 5, when the handset is in position the rib 45 is engaged in the groove 47, as described above. This tends to lock the handset in position against being displaced by knocks or jars, or by pulling on the handset cord 55. Any attempt of the handset to rotate upward from the bottom, i.e. outward and upward movement of the receiver end, creates a wedging action between rib 45 and groove 47, and the bottom surface 40 of the cup 20. But this does not interfere with correct removal of the handset. It is normally arranged that the face surface of the transmitter housing 26 and the surface 40 of the cup 20 are substantially parallel and in contact when the handset is in position, whether wall mounted or desk mounted.

The pivotal movement of the cup 20 can be controlled. Thus one or more shallow ribs 56 can be provided on the bottom surface of the lever 42. An alternative is to arrange for the portion 54—abutment for the spring 53—to contact the top surface 57 of the boss 52. The line cord to the telephone set is normally via a wall outlet, when wall mounted, as indicated diagrammatically at 58 in FIG. 5. In the desk mounting mode, the line cord can be fed via the wedge shaped adaptor, as illustrated at 59 in FIG. 4.

One form of cup 20 is effective for both wall and desk mounting and there is provided an integral cup and hookswitch actuator which is fully acceptable for both wall and desk mounting of a telephone set and gives accepted contact loading of the hookswitch in either mounting configuration.

The groove 47 can also be arranged to engage over a rib along the top edge of the top housing, so that the handset can be hung on the telephone set base, when wall mounted, in an off hook condition. This can be useful when a third party is being called to the telephone. This avoids leaving the handset dangling on the handset cord.

What is claimed is:

1. An integral cup and hookswitch for a telephone set, comprising;
   a cup for receiving one end of a handset, said cup including a bottom surface and a lever extending below said bottom surface and having an inner end;
   means pivotally mounting said cup at an outer edge on a telephone set base, for pivotal movement about an axis parallel to said outer edge, said lever extending inward from said axis;
   a switch positioned in said telephone set base, said switch including contact actuating members extending beneath said inner end of said lever;
   means resiliently biasing said cup about said axis to move said lever inner end upward to actuate said switch to an off hook condition;
   replacement of a handset pivoting said cup against said resilient biasing means to move said lever inner end downward and actuate said switch to an on hook condition.

2. A hookswitch as claimed in claim 1, said cup pivotally mounted at a rear edge of said telephone set base.

3. A hookswitch as claimed in claim 1, said telephone set base having a bottom surface, said switch mounted on said bottom surface, and said cup pivotally mounted at a rear edge of said bottom surface.

4. A hookswitch as claimed in claim 3, said cup having an inwardly and upwardly inclined bottom surface and an upwardly extending lip at its inner edge.

5. A hookswitch as claimed in claim 4, the telephone set base having a slot in a rear wall, said slot extending to said bottom surface, said cup including side walls, said side walls aligned at their outer edges with the sides of said slot.

6. A hookswitch as claimed in claim 4, including a rearwardly extending rib at the top edge of said upwardly extending lip.

7. A hookswitch as claimed in claim 6, said rearwardly extending rib adapted to engage in a groove in a handset.

8. A hookswitch as claimed in claim 4, said lever extending below and spaced from said bottom surface of said cup, and at least a rib on the bottom surface of said lever, said rib contacting the bottom surface of the telephone set base in an on hook condition.

9. A hookswitch as claimed in claim 1, said means resiliently biasing said cup comprising a compression spring positioned between said switch and said cup.

10. A hookswitch as claimed in claim 9, including a hollow boss on a top surface of said switch, said spring positioned at its lower end in said boss, an abutment on the bottom surface of said cup, said spring at its upper end in engagement with the abutment.

11. A hookswitch as claimed in claim 10, said boss having a top surface, said abutment engaging said top surface of said boss when said cup is in an on hook condition.

12. A hookswitch as claimed in claim 4, said telephone set adapted for mounting alternatively on a horizontal or a vertical surface, said receiver end of said handset positioned on said bottom surface in said cup, to pivot said cup downwards, when mounted on a horizontal surface; said receiver end of said handset positioned on said upwardly extending lip of said cup to pivot said cup rearwards when mounted on a vertical surface.

* * * * *